April 3, 1945.  P. ORR  2,372,734
TRANSMISSION
Filed July 8, 1943  2 Sheets-Sheet 2
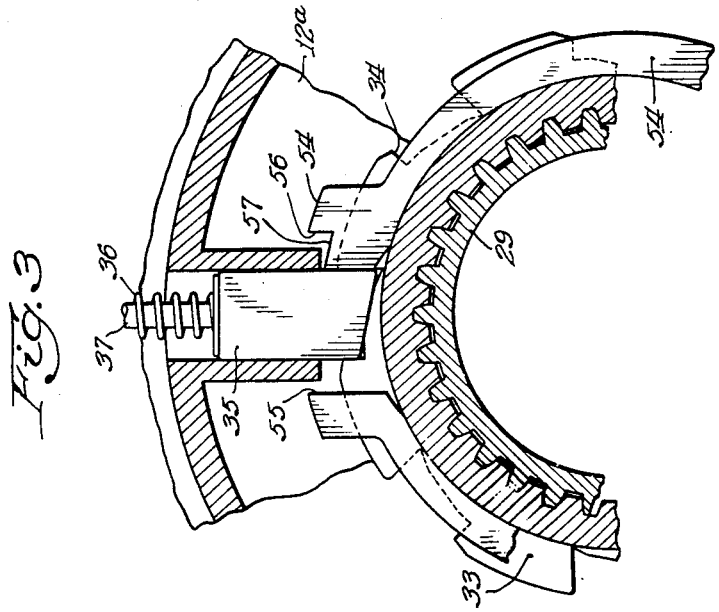
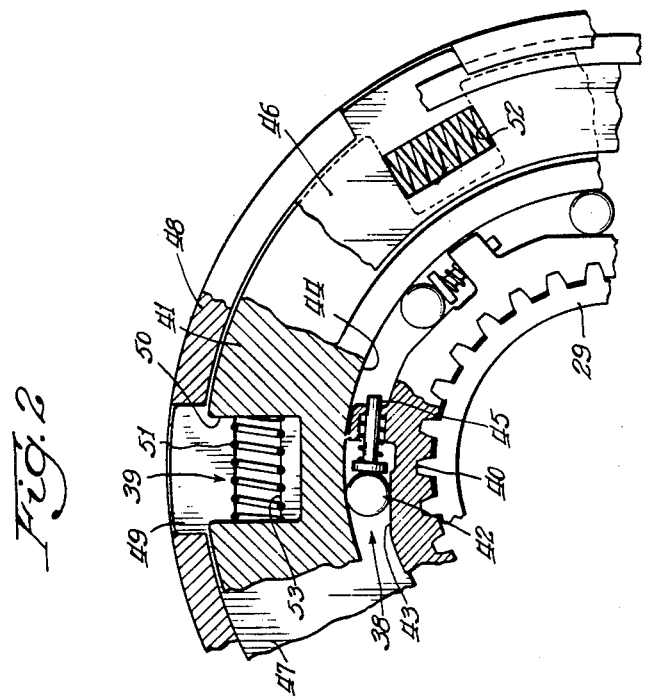
Inventor:
Palmer Orr
By: Edward C. Fitzhaugh
Atty.

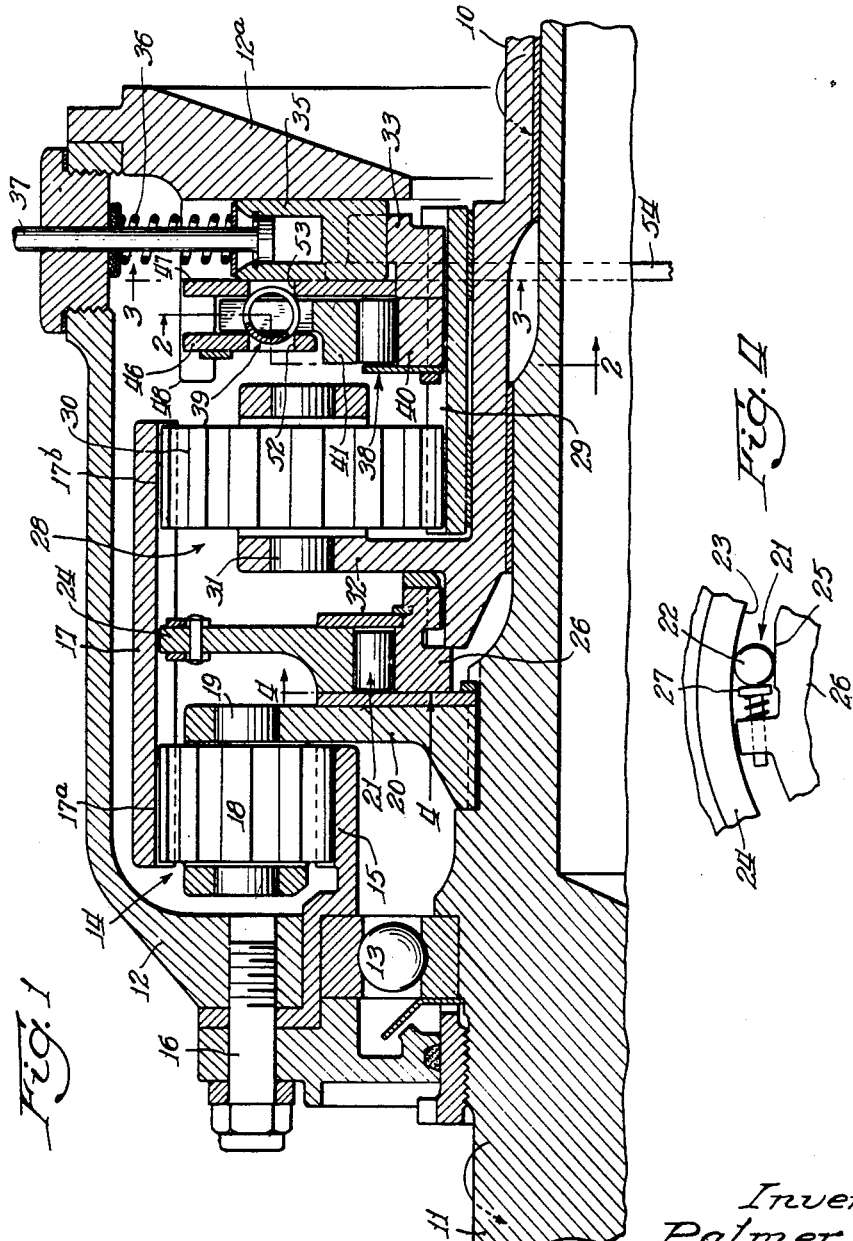

Patented Apr. 3, 1945

2,372,734

UNITED STATES PATENT OFFICE 2,372,734

TRANSMISSION

Palmer Orr, Muncie, Ind., assignor to Borg-Warner Corporation, Chicago, Ill., a corporation of Illinois Application July 8, 1943, Serial No. 493,827

17 Claims. (Cl. 74—290)

This invention relates to transmissions and more particularly to transmissions which are suitable for use in airplanes between the engines and propellers thereof and function to drive the propellers at lower than engine speed.

In a co-pending application of William E. Moffitt, Serial No. 359,987, filed October 7, 1940, there is disclosed an airplane transmissin providing two speed ratios, an underdrive speed ratio and a direct drive. The direct drive is provided by means of a dog interengaging in a window or slot provided in another element, and the underdrive speed ratio is provided by means of gearing and braking means providing a reaction point for the gearing. The braking means comprises a one-way roller brake and a friction brake, with the construction being such that the one-way brake takes the greater part of the reaction for driving a propeller on the driven shaft of the transmission through the transmission and the friction brake takes the reaction when the propeller tends to drive the driving shaft of the transmission and an airplane engine connected therewith and functions as a flywheel for the engine. The dog may be shifted in and out of engagement with the corresponding window, and the friction brake may be engaged and disengaged for changing the speed ratio of the transmission.

It is an object of my invention to provide an improved transmission particularly suitable for airplanes which is of such construction that the input and output shafts are not disconnected at any speed ratio at which the transmission may be set whereby a propeller on the driven shaft of the transmission may always function as a flywheel for an engine connected with the driving shaft and which is of such construction that the shift from one speed ratio to another may be made by actuating a single operator, such as a coupling unit or more particularly a positive type brake, as distinguished from the two operators, the friction brake and dog, required to be actuated for shifting the Moffitt transmission.

It is another object of my invention to provide an improved transmission of this type for driving at a low or high speed ratio having a positive coupling unit, particularly in the form of a positive brake having interengageable elements, which provides the high speed ratio through the transmission when engaged and to provide a construction for preventing the interengageable elements of the coupling unit from contacting each other when there is relative rotation between the interengageable elements and allowing the elements to engage when there is substanital synchronism between the elements. To this end it is an object to provide a one-way brake for taking the coast load through the transmission, that is, a load due to the driven shaft of the transmission driving the driving shaft of the transmission, a blocker member for normally blocking engagement of the positive coupling unit, and a spring construction permitting the elements of the one-way brake to have a limited relative movement in the direction for engaging the one-way brake and with the elements on such movement moving the blocker member whereby it allows engagement of the positive coupling unit.

In its preferred form my improved transmission comprises a driving shaft, a driven shaft, a planetary underdrive gear set for driving the driven shaft, a one-way clutch for connecting the driving shaft with the underdrive gear set for providing a low speed ratio, a planetary overdrive gear set for selectively driving the underdrive gear set, with the overdrive gear set comprising ring, sun and planet gears and a planet gear carrier which is driven by the driving shaft, a positive-type brake for the sun gear of the overdrive gear set and comprising a slotted element on the sun gear and a plunger for engaging the slotted element and providing a high speed ratio between the driving and driven shafts when engaged, a one-way brake for the sun gear of the overdrive unit whereby the driving shaft may drive the driven shaft in a forward direction through the overdrive gear set and whereby the slotted element may be stopped from rotation, a spring means in series with the one-way brake for allowing a limited rotation of the sun gear of the overdrive unit in a direction reverse to its rotation when the driven shaft is being driven at low speed ratio, and a blocker element for blocking engagement of the plunger with the slotted element when the sun gear of the overdrive unit is rotating due to the driven shaft being driven at low speed ratio and with the blocker being actuated on the limited rotation of the sun gear in the reverse direction for thereafter permitting engagement of the plunger with the slotted element. It is contemplated that the overdrive gear set shall preferably be such as to cause an increase in speed which is less than the decrease in speed caused by the underdrive gear set whereby the driven shaft at either speed ratio rotates at less speed than the driving shaft.

My invention consists of the novel constructions, arrangements and devices to be hereinafter described and claimed for carrying out the above-stated objects and such other objects as will appear from the following description of a certain preferred embodiment illustrated in the accompanying drawings, wherein:

Fig. 1 is a longitudinal sectional view of a transmission embodying the principles of my invention;

Fig. 2 is a sectional view taken on line 2—2 of Fig. 1;

Fig. 3 is a sectional view taken on line 3—3 of Fig. 1; and

Fig. 4 is a sectional view taken on line 4—4 of Fig. 1.

Like characters of reference designate like parts in the several views.

The illustrated transmission comprises a driving shaft 10 and a driven shaft 11, with the shaft 11 being rotatably mounted with respect to a transmission housing 12 by means of a bearing 13 of the ball type and being journaled inside the shaft 10 as shown. The shaft 10 is adapted to be connected with an airplane engine (not shown) and to be driven thereby, and the shaft 11 is adapted to carry an airplane propeller (not shown) and to drive the propeller.

An underdrive unit 14 is provided which is adapted to be driven by the driving shaft 10 and to drive the driven shaft 11. The underdrive unit 14 comprises a sun gear 15 which is fixed with respect to the transmission housing 12 by means of bolts 16 as shown, a ring gear 17, a plurality of planet gears 18 (one being shown in the drawings) in mesh with the sun gear 15 and a portion 17a of the ring gear 17, a plurality of stub shafts 19 each of which carries one of the gears 18, and a planet gear carrier element 20 carrying the shafts 19 and splined to the shaft 11.

The driving shaft 10 is connected to drive the underdrive unit 14 by means of a one-way roller clutch 21. The clutch 21 comprises a plurality of rollers 22, an inner cylindrical surface 23 formed on a member 24 and cammed surfaces 25 formed on an inner member 26. Spring-pressed plungers 27 are provided for wedging the rollers 22 between the surfaces 25 and 23, and the clutch 21 engages when the member 26 is rotated in the counterclockwise direction, as seen in Fig. 4, with respect to the member 24 and disengages when the members 24 and 26 move in the reverse directions with respect to each other as is apparent. The member 26 is splined to the shaft 10, and the member 24 is splined to the ring gear 17, and the members 26 and 24 thereby rotate with the shaft 10 and ring gear 17 respectively. When the shaft 10 is rotated in a foward direction as indicated by the arrow in Fig. 1, the member 26 is rotated in such direction or counterclockwise as seen in Fig. 4, and the roller clutch 21 is engaged to rotate the member 24, and ring gear 17 also in such direction. Such movement of the ring gear 17 revolves the planet gears 18 about the sun gear 15, and the carrier element 20 and shaft 11 are thereby also rotated in the same direction as shaft 10 but at a slower speed or reduction speed ratio, as is apparent.

A planetary overdrive unit 28 is provided for selectively driving the underdrive unit 14, instead of allowing the unit 14 to be driven by means of the roller clutch 21, to provide another speed ratio. The overdrive unit 28 comprises a sun gear 29 rotatively disposed on the shaft 10, the ring gear 17, a plurality of planet gears 30 (one being shown in the drawings) which are in mesh with the sun gear 29 and the portion 17b of the ring gear 17, a plurality of stub shafts 31 each of which carries one of the gears 30, and a flange portion 32 on the shaft 10 carrying the stub shafts 31 and functioning as a planet gear carrier.

Positive-type means for coupling the sun gear 29 to the housing 12 or braking the sun gear is provided whereby the overdrive unit 28 may be made effective to drive the underdrive unit 14. The braking means comprises an element 33 splined to the sun gear 29 and provided with slots 34, and a plunger 35 slidably disposed in a suitable cavity in a transmission housing portion 12a and adapted to engage in any of the slots 34 in the element 33. A spring 36 is provided for urging the plunger 35 into engagement in any of the slots 34, and the plunger is provided with a shank 37 by means of which the plunger may be manually operated to disengage the plunger from the slotted element 33. The overdrive unit 28, as is apparent, is effective to drive the underdrive unit 14 through the ring gear 17 when the plunger 35 is in engagement with any of the slots 34, and the overdrive unit 28 is ineffective to drive the unit 14 whereby the latter unit may be driven through the roller clutch 21 when the plunger 35 is out of engagement in any of the slots 34. The plunger 35 when in engagement in any of the slots 34 functions to hold the element 33 and thereby the sun gear 29 against rotation in either direction, and thus the drive through the overdrive unit and thereby between the shafts 10 and 11 is a two-way drive whereby the shaft 10 may drive the shaft 11 or vice versa.

Auxiliary one-way means for coupling the sun gear 29 to the housing 12 or braking the sun gear is also provided, in addition to the positive braking means including the plunger 35 and slotted element 33. The one-way braking means comprises a roller unit 38 and spring means 39 in series with the roller unit. The unit 38 is formed by a member 40 splined to the sun gear 29, an annular element 41 disposed about the element 40 and rollers 42 between the elements 40 and 41. The element 40 is provided with cammed surfaces 43, and the element 41 is provided with a cylindrical surface 44, and spring pressed plungers 45 are provided for acting on the rollers 42 to wedge the rollers between the surfaces 43 and 44, whereby the unit 38 functions when the element 40 tends to rotate in a clockwise direction as seen in Fig. 2 to connect the elements 40 and 41, as is apparent.

The spring means 39 in series with the unit 38 comprises a pair of discs 46 and 47 on opposite sides of the element 41. The discs fit in a tubular portion 48 provided on the transmission housing portion 12a, and each of the discs is provided with lug portions 49 which fit in appropriate slots provided in the tubular portion 48 and function to hold the discs against rotation. The element 41 is provided with a plurality of slots 50 in its periphery in each of which is disposed a spring 51, and the discs 46 and 47 are provided with slots 52 and 53 respectively which are of substantially the same length as the slots 50 and which receive side portions of the springs 51, as shown. The spring means 39 functions to allow a limited movement of the element 41 in a clockwise direction as seen in Fig. 2 with the slots 50 each bearing on one end of a spring 51 and with ends of slots 52 and 53 corresponding to the slot 50 bearing on the opposite end of the spring and with the spring being thereby compressed by such movement of the element 41. Such movement of element 41 may be under the action of the roller unit 38, after the unit 38 has been engaged, by clockwise movement of the sun gear 29 and the element 40, as is apparent.

A blocker 54 is provided for the plunger 35 and is disposed about the slotted element 33 as shown and in frictional contact with the element whereby the blocker tends to move with the element. The blocker 54 is provided with an abutment 55 on one side and an abutment 56 on the other side, the abutment 55 being adapted to contact a part of the housing portion 12a and prevent further clockwise movement of the blocker as seen in Fig. 3, and the abutment 56 being adapted to contact a part of the housing portion 12a and prevent further counterclockwise movement of the blocker 54. The blocker 54 is also provided with a blocking surface 57 which, when the plunger 35 is moved upwardly from its position as seen in the drawings and when the blocker 54 is rotated in a counterclockwise direction from its position as seen in the drawings such that the abutment 56 contacts the housing portion 12a, functions to prevent movement of the plunger downwardly for engaging in any of the slots 34.

The illustrated transmission provides two forward speed ratios, a low speed ratio and a high speed ratio. The drive in low speed ratio is through the one-way clutch 21 and the underdrive unit 14, and the drive in high speed ratio is through both of the units 28 and 14. It will be observed that the planet gears 30 are larger in size than the planet gears 18, and since the units 28 and 14 utilize different portions of the same ring gear 17, the decrease in speed ratio provided by the unit 14 is greater than the increase in speed ratio provided by the unit 28 when the latter is effective. The high speed ratio utilizing the unit 28, as well as the low speed ratio utilizing the unit 14 only, are therefore underdrive ratios; that is to say, the driven shaft 11 at both speed ratios is rotating at a slower speed than the shaft 10.

When the plunger 35 is retracted by the operator against the action of the spring 36 and is disengaged from the slotted element 33, the unit 28 is ineffective and the shaft 11 is driven at low speed ratio. The drive in low speed ratio is from the shaft 10 through the element 26, the rollers 22, the element 24, the ring gear 17, the gears 18, the stub shafts 19 and the element 20 to the shaft 11. The ring gear 17 is driven at the same speed as the shaft 10 by means of the clutch 21, and since the sun gear 15 is stationary, the element 20 and thereby the shaft 11 are rotated at a certain underdrive low speed ratio with respect to shaft 10, as is apparent. At this ratio, the sun gear 29 rotates counterclockwise as seen in Fig. 3 at the same speed and in the same direction as the shaft 10 since the ring gear 17 and carrier portion 32 are both rotating forwardly at the same speed, and the blocker 54 is rotated counterclockwise due to its frictional contact with the element 33 until the abutment 56 contacts the housing portion 12a to prevent further such rotation of the blocker, and the surface 57 becomes positioned under the plunger 35 to prevent its downward movement for engaging in any of the slots 34 if the shank 37 is released by the operator for allowing the spring 36 to be effective to move the plunger downwardly.

The transmission provides high speed ratio when the plunger 35 is engaged in one of the slots 34 in the element 33 thereby holding the element 33 and the sun gear 29 stationary. The drive is then from the shaft 10 through the flange portion 32, the stub shafts 31, the planet gears 30, to the ring gear 17, with the gears 29, 30 and 17 acting as an overdrive to drive the gear 17 at a greater speed than the shaft 10, and the drive from the ring gear 17 is through the planet gears 18, the stub shafts 19, the carrier portion 20 to the shaft 11, with the ring gear 17, the planet gears 18 and the sun gear 15 functioning as an underdrive. When the shaft 11 is thus driven, since the ring gear 17 is rotating at a faster speed than the shaft 10, the one-way clutch 21 overruns and thereby breaks the connection made through the clutch between the ring gear 17 and the shaft 10 for the drive in low speed ratio.

The roller units 21 and 38 are so arranged as to provide a two-way connection between the shafts 10 and 11, that is, a connection whereby the shaft 10 may drive the shaft 11 or vice versa, when the plunger 35 is disengaged from the slotted element 33 and the transmission is set for low speed drive. The plunger 35 is so arranged to engage with the slots 34 in the member 33 so as to prevent a rotation of the member 33 in either direction, as has been hereinbefore explained, and it will thus be apparent that in high speed drive, the drive is two-way, that is, either shaft may drive the other. In low speed drive, however, as has been explained, the drive is through the one-way clutch 21 which may disengage and permit the ring gear 17 to rotate at a faster speed than the shaft 10 whereby the connection between the shafts through the low speed power train is broken. When the transmission is set for low speed drive and the shaft 11 tends to rotate at a higher speed than that at which it is driven through the clutch 21, the ring gear 17 and shaft 11 will rotate free of shaft 10 until the speed of the ring gear 17 has increased such that its speed ratio with respect to the shaft 10 is that which would be provided by the overdrive unit if it were effective. At this speed of the gear 17, the sun gear 29 will have stopped its rotation in a counterclockwise direction as seen in Figs. 2 and 3, and any further increase in speed of the gear 17 with respect to the shaft 10 will be prevented by the one-way brake comprising roller unit 38 and spring means 39 becoming effective to prevent a rotation of the sun gear 29 in a clockwise direction as seen in these figures. The one-way brake thus functions to complete a power train through the overdrive unit 28 whereby the driven shaft 11 may rotate the driving shaft 10, and a propeller on shaft 11 when rotating may thus function as a flywheel for rotating shaft 10 and an engine connected with the latter shaft. If an engine connected with the shaft 10 is brought to idling speed, the engine will not stall due to the lack of a flywheel, due to this function of the one-way brake.

When the shaft 11 is being driven in low speed drive through the one-way clutch 21; the sun gear 29, as has been hereinbefore explained, is rotating in a counterclockwise direction as seen in Figs. 2 and 3. With the plunger 35 having been moved upwardly out of position for engaging in any of the slots 34 by means of the shank 37, such rotation of the sun gear 29 and thereby the element 33 acts to move the blocker 54 and hold the blocker in a position with the abutment 56 in engagement with the housing portion 12a. When the shank 37 is thereafter released, the surface 57 functions to hold the plunger 35 in a position whereby it may not engage with the element 33, and the transmission is thus maintained in low speed ratio. In order thereafter to shift the transmission to provide high speed ratio, the speed of the shaft 10 is decreased with respect to the speed of the shaft 11 with overrunning of the clutch 21 until the ratio of speeds between the shafts 10 and 11 is substantially high speed ratio whereby the rotation of the sun gear 29 is stopped, the unit 38 is engaged, and the shaft 11 drives the shaft 10 through the overdrive unit 28. The reaction point for the overdrive unit 28, when the shaft 10 is thus being driven by the shaft 11 through the overdrive unit, is the one-way brake comprising unit 38, as is apparent, and the sun gear 29 has force applied thereto by the planet gears 30 tending to rotate the sun gear in a clockwise direction as seen in Figs. 2 and 3. This force applied to the sun gear 29 is transmitted through the unit 38 to the member 41, and the member 41 rotates slightly in a clockwise direction as seen in Fig. 2 against the action of the springs 51, with the discs 46 and 47 remaining stationary due to their projections 49 disposed in slots in the tubular housing portion 48. The unit 38, the element 40, the sun gear 29 and thereby the element 33 rotate with the element 41 against the action of the springs 51 in a clockwise direction as seen in Fig. 2, and such rotation of the element 33, due to the frictional contact between the blocker 54 and element 33 functions to move the blocker clockwise as seen in Fig. 3 to move the surface 57 to the right as seen in Fig. 3 from under the plunger 35, and the plunger moves downwardly under the action of the spring 36 to a position for engaging in any of the slots 34. The plunger will then engage in one of the slots 34, with such engagement being without any further rotation of the element 33 if a slot 34 is directly below the plunger when the plunger descends, or with a further rotation of the element 33 against the action of the spring means 39, or when the element 33 starts rotation in a counterclockwise direction as seen in Figs. 2 and 3 on the speed of the shaft 10 being increased after the plunger 35 has descended. In brief, then, a change of speed ratio from low speed ratio to high speed ratio is made by releasing the shank 37, whereby the spring 36 urges the plunger 35 against the surface 57, and thereafter decreasing the speed of the shaft 10, as by decelerating an engine connected with the shaft 10, whereby the shaft 11 may drive the shaft 10 and the sun gear 29 may change its direction of rotation from counterclockwise as seen in Figs. 2 and 3 to clockwise against the action of the springs 51, whereby the blocker 54 is rotated out of blocking position to allow the plunger 35 to move downwardly into position for engaging any of the slots 34, and then applying torque to shaft 10 for driving shaft 11.

In order to shift the transmission from high speed ratio to low speed ratio, the plunger 35 is withdrawn from the slot 34, in which it was engaged for high speed ratio, against the action of the spring 36. The ring gear 17 is then again driven through the one-way clutch 21, and the shaft 11 is driven at low speed ratio. The sun gear 29 again rotates in a counterclockwise direction as seen in Figs. 2 and 3 to disengage the unit 38 and to move the blocker 54 counterclockwise as seen in Fig. 3 whereby its abutment 56 contacts the housing portion 12a and the surface 57 is positioned beneath the plunger 35 whereby the plunger if released may not move downwardly into position for engaging in any of the slots 34.

My improved transmission is of such construction that it may be easily controlled; it is only necessary to disengage the plunger 35 from the element 33 to shift to low speed ratio from high speed ratio and to release the plunger 35 whereby the spring 36 may freely act on the plunger and to decrease the speed of the shaft 10 with respect to the shaft 11 for shifting from low speed ratio to high speed ratio. The transmission further is of such construction that in either low or high speed ratio, either of the shafts 10 or 11 may drive the other shaft. Due to the provision of the one-way brake, including roller unit 38 and spring means 39, and the blocker 54, there is no unnecessary and probably harmful ratcheting of the plunger 35 on the slotted element 33 prior to engagement of the plunger and slotted element.

I wish it to be understood that I do not intend to limit my invention to the constructions and arrangements shown and described except only insofar as certain of the appended claims are specifically so limited, as it will be apparent to those skilled in the art that modifications may be made without departing from the principles of the invention.

I claim:

1. In a transmission, the combination of a driving shaft, a driven shaft, means providing a power train between said shafts and including a positive coupling for connecting a certain two elements together and thereby completing the power train, said coupling comprising a pair of interengageable members, said members ratcheting over each other if they are in contact but out of interengagement and there is relative movement between said elements, a one-way coupling between said two elements for completing said power train when said positive coupling is disengaged, yieldable means between one of said elements and said one-way coupling for allowing a limited movement of one of said elements with respect to the other element in the direction for engaging the one-way coupling after the one-way coupling is engaged, and a movable obstruction for allowing and preventing engagement of said interengageable members, said obstruction being actuated by relative movement between said elements whereby to prevent contact between said interengageable members and thereby to prevent ratcheting of the members on each other when said elements move with respect to each other such that the one-way coupling overruns and being moved out of the way of said interengageable members to allow interengagement thereof when there is a reversal of movement between said elements with engagement of the one-way coupling and stressing of said yieldable means.

2. In a transmission, the combination of a driving shaft, a driven shaft, means providing a power train between said shafts and including a positive coupling for connecting a certain two elements together and thereby completing the power train, a one-way coupling between said two elements for completing said power train when the positive coupling is disengaged, yieldable means between one of said elements and said one-way coupling for allowing a limited movement of one of said elements with respect to the other element in the direction for engaging the one-way coupling after the one-way coupling is engaged, and a blocker member actuated by relative movement between said elements for preventing engagement of said positive coupling when said elements move with respect to each other such that the one-way coupling overruns and permitting engagement of the positive coupling when there is a reversal of movement between said elements with a stressing of said yieldable means.

3. In a transmission, the combination of a driving shaft, a driven shaft, means providing a power train between said shafts for rotating said driven shaft at a low speed ratio with respect to said driving shaft, automatic means for breaking said power train, means providing another power train between said shafts for rotating said driven shaft at a higher speed ratio with respect to said driving shaft, said last named means including positive coupling means for completing said last-named power train, one-way coupling means for coupling two elements together for thereby completing said last-named power train when said positive coupling means is disengaged, yieldable means connected serially with said one-way coupling means for allowing a limited movement of one of said elements with respect to the other element in the direction for engaging the one-way coupling means after the one-way coupling means is engaged, and means for engaging said positive coupling means on such relative movement between said elements.

4. In a transmission, the combination of a driving shaft, a driven shaft, means providing a power train between said shafts for rotating said driven shaft at a low speed ratio with respect to said driving shaft and including a one-way clutch, means providing another power train between said shafts for rotating said driven shaft at a higher speed ratio with respect to said driving shaft, said last named means including a positive coupling for completing said last-named power train, a one-way coupling for coupling a certain two elements together for thereby completing said last named power train when the positive coupling is disengaged, spring means connected serially with said one-way coupling for allowing a limited movement of one of said elements with respect to the other element in the direction for engaging the one-way coupling after the one-way coupling is engaged, and a blocker member actuated by relative movement between said elements whereby to prevent engagement of said positive coupling when said elements move with respect to each other such that the one-way coupling overruns and to permit engagement of the positive coupling when there is a reversal of movement between said elements with a stressing of said spring means.

5. In a transmission, the combination of a driving shaft, a driven shaft, gearing providing a power train between said shafts and including a positive brake for an element of the gearing for completing the power train, a one-way brake for said element for completing the power train when the positive brake is disengaged, yieldable means connected serially with said one-way brake for allowing a limited movement of said element in the direction for engaging the one-way brake after the one-way brake is engaged, and a blocker actuated by movement of said element whereby to prevent engagement of said positive brake when said element moves in a direction such that the one-way brake overruns and to allow engagement of the positive brake when there is a reversal of movement of said element with a stressing of said yieldable means.

6. In a transmission, the combination of a driving shaft, a driven shaft, gearing providing a power train between said shafts for rotating said driven shaft at a certain speed ratio with respect to said driving shaft, a one-way clutch for said gearing adapted for automatically breaking said power train, gearing providing another power train between said shafts for rotating said driven shaft at a higher speed ratio with respect to said driving shaft, said last-named gearing including a positive type brake for an element of the gearing for completing said last-named power train, a one-way brake for said element for completing said last-named power train when the positive brake is disengaged and overrunning when said driven shaft is driven through said first-named power train, yieldable means connected serially with said one-way brake for allowing a limited movement of said element in the direction for engaging the one-way brake after the latter brake is engaged, and a blocker actuated by movement of said element for preventing engagement of said positive brake when said element moves in a direction such that the one-way brake overruns and allowing engagement of the positive brake when there is a reversal of movement of the element with a stressing of said yieldable means.

7. In a transmission, the combination of a driving shaft, a driven shaft, gearing providing a power train between said shafts for rotating said driven shaft at a certain speed ratio with respect to said driving shaft, a one-way clutch for completing said power train and adapted to overrun to break said power train, gearing providing another power train between said shafts for rotating said driven shaft at a higher speed ratio with respect to said driving shaft, a positive brake for an element of said last-named gearing and functioning to complete said last-named power train, said brake comprising a pair of interengageable members and spring means for urging said members into engagement, said members ratcheting over each other if they are in contact but out of engagement and there is movement of said element, a one-way brake for said element for completing said last-named power train whereby said driven shaft may drive said driving shaft and overrunning when said driven shaft is driven through said first-named power train, yieldable means connected serially with said one-way brake for allowing a limited movement of said element in the direction for engaging the one-way brake after the one-way brake is engaged, and a movable obstruction for allowing and preventing engagement of said interengageable members, said obstruction being actuated by movement of said element whereby to prevent contact between said members and thereby to prevent ratcheting of the members on each other when the drive is through said first-named power train and said element moves such that the one-way brake overruns and whereby to be moved out of the way of said interengageable members to allow interengagement thereof when there is a reversal of movement of said element with engagement of the one-way brake and stressing of said yieldable means due to the driving of said driving shaft by said driven shaft through said second-named gearing.

8. In a transmission, the combination of a driving shaft, a driven shaft, planetary gearing comprising a sun gear element, a ring gear element, a planet gear in mesh with said sun and ring gear elements and a planet gear carrier element, one of said elements being connected in driving relation with one of said shafts and another of said elements being connected in driving relation with the other of said shafts, a positive brake and a one-way brake for the other of said elements, and yieldable means associated with said one-way brake for allowing rotation of said last-named element in the direction for engaging said one-way brake, and means for engaging said positive brake on rotation of said last-named element in the direction for engaging the one-way brake.

9. In a transmission, the combination of a driving shaft, a driven shaft, planetary gearing comprising a sun gear element, a ring gear element, a planet gear in mesh with said ring gear and sun gear elements, and a planet gear carrier element, one of said elements being connected in driving relation with one of said shafts and another of said elements being connected in driving relation with the other of said shafts, a positive brake and a one-way brake for the other of said elements, yieldable means associated with said one-brake for permitting movement of said last-named element in the direction for engaging the one-way brake, and a blocker for preventing engagement of said positive brake when said last-named element moves in a direction such that the one-way brake overruns and actuated by a reversal of movement of said last-named element with an engagement of the one-way brake and a stressing of said yieldable means for permitting engagement of the positive brake.

10. In a transmission, the combination of a driving shaft, a driven shaft, planetary gearing comprising a sun gear, a ring gear, a planet gear in mesh with the sun and ring gears, and a planet gear carrier, said ring gear being connected in driving relation with said driven shaft and said carrier being connected in driving relation with said drivng shaft, a positive brake and a one-way brake for said sun gear, said positive brake comprising a slotted element connected with the sun gear and a plunger for engaging the slotted element, yieldable means connected serially with said one-way brake for permitting restricted rotation of the sun gear in the direction for engaging the one-way brake, and a blocker element actuated by movement of said sun gear and slotted element whereby to prevent engagement of said plunger and slotted element when said sun gear rotates in the direction such that the one-way brake overruns and allowing engagement of the plunger with the slotted element when there is a reversal of rotation of said sun gear with a stressing of said yieldable means.

11. In a transmission, the combination of a driving shaft, a driven shaft, means providing a power train between said shafts for rotating said driven shaft at a certain speed ratio with respect to said driving shaft and including a one-way clutch, means providing another power train between said shafts for rotating said driven shaft at a higher speed ratio with respect to said driving shaft, said last-named means including planetary gearing comprising a ring gear adapted to drive said driven shaft, a sun gear, a planet gear in mesh with the sun and ring gears, and a planet gear carrier adapted to be driven by said driving shaft, a positive brake for said sun gear, a one-way brake for said sun gear whereby said driven shaft may drive said driving shaft through said second-named power train, spring means associated with said one-way brake for permitting movement of said sun gear in a direction for engaging the one-way brake after the one-way brake is engaged, and a blocker element actuated by movement of said sun gear and preventing engagement of said positive brake when said sun gear rotates in a direction such that the one-way brake overruns and permitting engagement of the positive brake when there is a reversal of rotation of the sun gear with a stressing of said yieldable means.

12. In a transmission, the combination of a driving shaft, a driven shaft, a planetary underdrive unit connected to drive said driven shaft, a one-way clutch for connecting said driving shaft and said underdrive unit, a planetary overdrive unit driven by said driving shaft and adapted for selectively driving said underdrive unit, a positive brake for the sun gear of said overdrive unit for making the overdrive unit effective for driving said underdrive unit, and a one-way brake for said sun gear whereby said driven shaft may drive the driving shaft through said two units.

13. In a transmission, the combination of a driving shaft, a driven shaft, a planetary underdrive unit connected to drive said driven shaft, a one-way clutch for connecting said driving shaft and said underdrive unit, a planetary overdrive unit driven by said driving shaft and adapted for selectively driving said underdrive unit, a positive brake for the sun gear of said overdrive unit for making the latter unit effective for driving said underdrive unit, a one-way brake for said sun gear whereby said driven shaft may drive the driving shaft through said overdrive unit, yieldable means associated with said one-way brake for permitting said sun gear to rotate in a direction for engaging said one-way brake after the one-way brake is engaged, and means for engaging said positive brake on such rotation of said sun gear against said yieldable means.

14. In a transmission, the combination of a driving shaft, a driven shaft, a planetary underdrive unit connected to drive said driven shaft, a one-way clutch for connecting said driving shaft and said underdrive unit, a planetary overdrive unit driven by said driving shaft and adapted for selectively driving said underdrive unit, a positive brake for the sun gear of said overdrive unit for making the overdrive unit effective, a one-way brake for said gear whereby said driven shaft may drive said driving shaft through said overdrive unit, yieldable means associated with said one-way brake whereby said sun gear may rotate in the direction for engaging the one-way brake after the one-way brake is engaged, and a blocker element actuated by rotation of said sun gear for preventing engagement of said positive brake when said sun gear rotates in the direction such that the one-way brake overruns and permitting engagement of the positive brake when there is a reversal of rotation of said sun gear with a stressing of said yieldable means.

15. In a transmission, the combination of a driving shaft, a driven shaft, an underdrive unit for driving said driven shaft and comprising a stationary sun gear, a ring gear, a planet gear in mesh with the sun and ring gears, and a planet gear carrier connected with said driven shaft, a one-way roller clutch connected between said ring gear and said driving shaft whereby said driving shaft may drive said underdrive unit, a planetary overdrive unit driven by said driving shaft and adapted for selectively driving said underdrive unit, said overdrive unit comprising a ring gear connected with said first-named ring gear, a sun gear, a planet gear in mesh with the sun and ring gears of the overdrive unit, and a carrier for the planet gear of the overdrive unit and connected with said driving shaft, a positive brake for the sun gear of said overdrive unit for making the overdrive unit effective and comprising a slotted element rotatable with the sun gear of the overdrive unit and a plunger adapted to engage with the slotted element, said underdrive unit being so arranged as to provide a greater decrease of speed ratio from its ring gear to its driven shaft than the increase of speed ratio provided by said overdrive unit between said driving shaft and the ring gear of the overdrive unit, a one-way roller brake for the sun gear of said overdrive unit and comprising a roller clutch unit and a stationary element, spring means between said roller clutch unit and said stationary element whereby the sun gear may rotate in the direction for engaging the one-way brake after the one-way brake is engaged, a blocker element actuated by rotation of the slotted element and sun gear of the overdrive unit and preventing the engagement of said plunger with the slotted element when the sun gear rotates in the direction such that the one-way brake overruns and allowing engagement of the plunger with the slotted element when there is a reversal of rotation of the sun gear of the overdrive unit with a stressing of said spring means, spring means for urging said plunger into engagement with said slotted element, and manually operated means for disengaging the plunger from the slotted element.

16. In combination, two relatively rotatable elements, a positive coupling for coupling said elements together, a one-way coupling for coupling the elements together, blocker means actuated by relative rotation between said elements for preventing engagement of said positive coupling when there is relative rotation between said elements in the direction such that the one-way coupling overruns and allowing engagement of the positive coupling when there is relative rotation in the opposite direction between said elements, and yieldable means connected between said one-way coupling and one of said elements for allowing relative rotation between the elements after the one-way coupling is engaged in the direction for engaging the one-way coupling.

17. In combination, a stationary element and a rotatable element, a positive brake for said rotatable element and comprising a member movable with the rotatable element and a second member interengageable therewith and held against rotation by said stationary element, a one-way brake for said rotatable element and comprising a member movable with the rotatable element and a member held against rotation by said stationary element, a blocker member actuated by movement of said rotatable element and preventing engagement of said positive brake when the rotatable element rotates in the direction such that the one-way brake overruns and allowing engagement of the positive brake when there is a reversal of rotation of said rotatable element, and spring means operatively disposed between one of said elements and said one-way brake for allowing a restricted rotation of said rotatable element after the one-way brake is engaged in the direction for engaging the one-way brake.

PALMER ORR.